US006433956B1

(12) United States Patent  
Peters et al.

(10) Patent No.: US 6,433,956 B1
(45) Date of Patent: Aug. 13, 2002

(54) CORDLESS COMPRESSION MOTOR CONNECTOR FOR A HARD DISK DRIVE

(75) Inventors: David Peters; Kirk Barrows Price; Andrew Keith Hanlon, all of San Jose; Daniel Robert Stacer, Morgan Hill, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/146,008

(22) Filed: Sep. 2, 1998

(51) Int. Cl.[7] ............................. G11B 33/14; H01R 9/09
(52) U.S. Cl. ....................... 360/97.01; 439/81
(58) Field of Search .................. 360/97.01, 97.02, 360/97.03, 98.01, 98.07; 439/50, 52, 65–66, 81–83, 271, 273, 519, 556, 559, 325, 326; 310/71

(56) References Cited

U.S. PATENT DOCUMENTS

| 4,295,700 A | 10/1981 | Sado ..................... 339/61 M |
| 4,358,173 A | 11/1982 | Conrad ..................... 339/17 |
| 4,923,406 A | 5/1990 | Bucknam ..................... 439/77 |
| 5,064,377 A | 11/1991 | Wood ..................... 439/67 |
| 5,357,160 A | 10/1994 | Kaneda et al. ........... 310/67 R |
| 5,436,517 A | 7/1995 | Ogawa ..................... 310/91 |
| 5,493,159 A | * 2/1996 | Norris ..................... 310/71 |
| 5,548,458 A | 8/1996 | Pelstring et al. ......... 360/99.08 |
| 5,657,183 A | 8/1997 | Ycas et al. ............. 360/97.01 |
| 5,659,213 A | 8/1997 | Imashiro et al. ............. 310/71 |
| 5,661,352 A | 8/1997 | Oguchi et al. ................ 310/71 |
| 5,673,157 A | 9/1997 | Ycas et al. .............. 360/97.01 |
| 5,705,868 A | 1/1998 | Cox et al. ..................... 310/71 |
| 5,746,607 A | 5/1998 | Bricand et al. ............... 439/66 |
| 5,751,514 A | 5/1998 | Hyde et al. ............. 360/97.01 |
| 5,966,267 A | * 10/1999 | Hooley et al. .......... 360/97.01 |

FOREIGN PATENT DOCUMENTS

| DE | 19724474 A1 | 12/1997 | .......... G11B/33/12 |
| EP | 0760510 A1 | 3/1997 | .......... G11B/25/04 |
| EP | 0867979 A1 | 9/1998 | .......... H01R/23/26 |
| WO | WO9602913 A1 | 2/1996 | .......... G11B/5/012 |
| WO | WO 97/266654 | 7/1997 | .......... G11B/17/02 |

* cited by examiner

Primary Examiner—George J. Letscher
(74) Attorney, Agent, or Firm—Abdy Raissinia; Bracewell & Patterson, L.L.P.

(57) ABSTRACT

A cordless compression motor connector connects a spindle motor inside a hard disk drive enclosure to a printed circuit board (PCB) mounted outside the disk enclosure. The disk enclosure includes a base casting formed with a lipped aperture. The connector includes a rigid, cantilever-like insulating body having conductors supported therein. The conductors terminate at the resilient spring contacts located at both ends of the connector body. One end of the connector body is secured to the PCB with a screw such that the resilient contacts on one end are compression connected to contacts on the PCB. The other end of the connector body passes through the aperture and reacts against the lip in the base casting. Contacts formed on the spindle motor are compression connected to the electrical contacts on the other end of the connector body.

15 Claims, 2 Drawing Sheets

US 6,433,956 B1

CORDLESS COMPRESSION MOTOR CONNECTOR FOR A HARD DISK DRIVE

TECHNICAL FIELD

This invention relates in general to electrical connectors and in particular to a electrical connector for a spindle motor in a hard disk drive.

BACKGROUND ART

The electrical connection of the spindle motor for a hard disk drive (HDD) requires a low cost, easily manufactured reliable connection which fits within a constrained space and maintains the sealed environment of the HDD. In one type of prior art design, the electrical portion of the spindle motor is built as a unit with a base plate, and the motor wires are sealed with potting compound as they exit the unit. This design has the disadvantage of requiring the disks to be stacked in the base plate which necessitates a screw-type clamp. Screw clamps are expensive and show poor curvature performance.

In a second prior art design, a flexible cable is routed through a hole or joint in the base casting and is sealed by a piece of tape or a gasket. The routing of the flexible cable in the manufacturing process is difficult. This solution also adds the cost of the flexible cable, and the seal performance is problematic. Additionally, the cable must be plugged to the printed circuit board (PCB) as an additional operation in the manufacturing process.

A third solution utilizes a connector which is integral to the base casting. The connector has a mating connector which is contained in the flange of the spindle motor. The motor wires exit the base casting either via a potted connector which is separate from the main arm electronics connector (AEC), or are joined to the AEC by a flexible cable located inside the file. Both the potted connector and the internal flexible cable add cost, and the routing of the motor signals through the AEC can introduce motor switching noise into the sensitive signals from the read-write heads in the other lines of the AEC. In addition, this design typically requires precise angular alignment of the motor to the base. This requirement enhances manufacturing difficulties and cost during assembly.

In a fourth prior art design, the connector is integral to the motor shaft which protrudes through the casting wall. The motor is secured by a nut which is external to the shaft. The connector is on the end of the shaft and plugs directly into the PCB. This is an expensive design which typically has pins in the motor that are vulnerable to damage. It also requires a nut that is more difficult to handle during the manufacturing process. In addition, this design limits the amount of space available for the motor since the end of the shaft must be at the PCB level. Limiting the motor space reduces its efficiency and increases the power consumption of the file. An improved electrical connector for the motor of an HDD is needed.

DISCLOSURE OF THE INVENTION

A cordless compression motor connector connects a spindle motor inside a hard disk drive enclosure to a printed circuit board (PCB) mounted outside the disk enclosure. The disk enclosure includes a base casting formed with a lipped aperture. The connector includes a rigid, cantilever-like insulating body having conductors supported therein. The conductors terminate at the resilient spring contacts located at both ends of the connector body. One end of the connector body is secured to the PCB with a screw such that the resilient contacts on one end are compression connected to contacts on the PCB. The other end of the connector body passes through the aperture and reacts against the lip in the base casting. Contacts formed on the spindle motor are compression connected to the electrical contacts on the other end of the connector body.

BEST MODE FOR CARRYING OUT THE INVENTION

Figure 1:
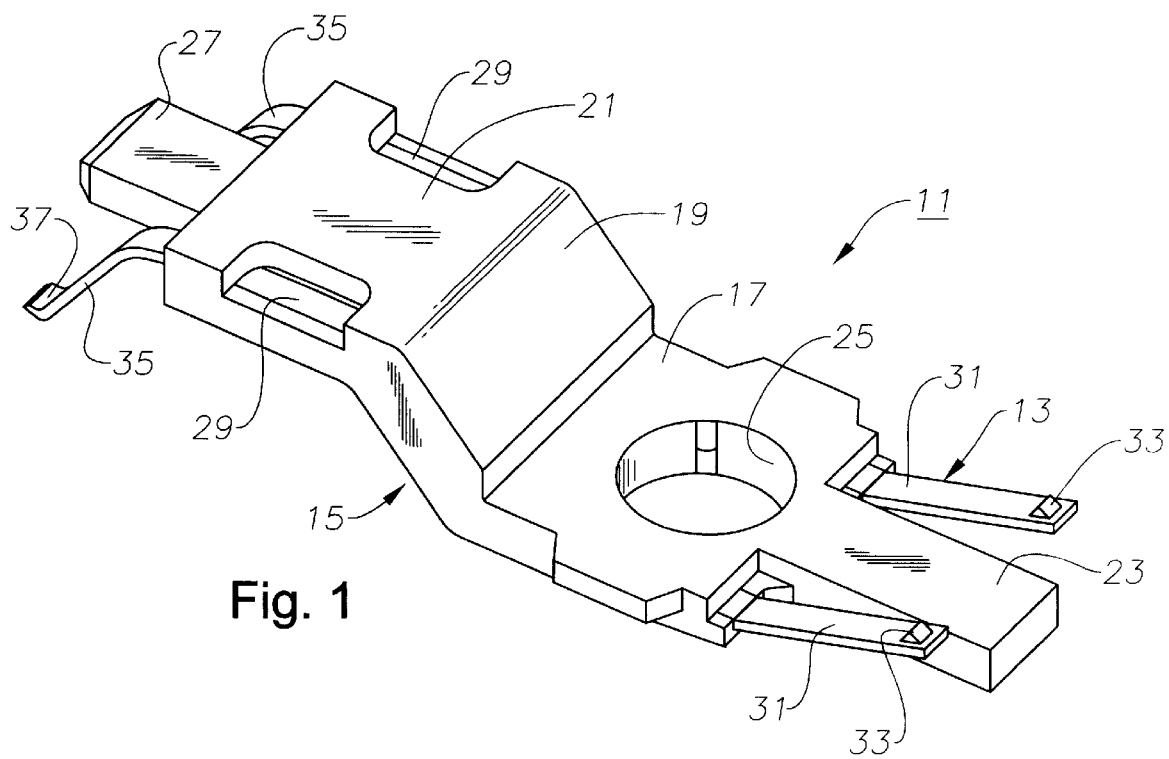
FIG. 1 is a lower isometric view of a first embodiment an electrical connector constructed in accordance with the invention.
Figure 2:
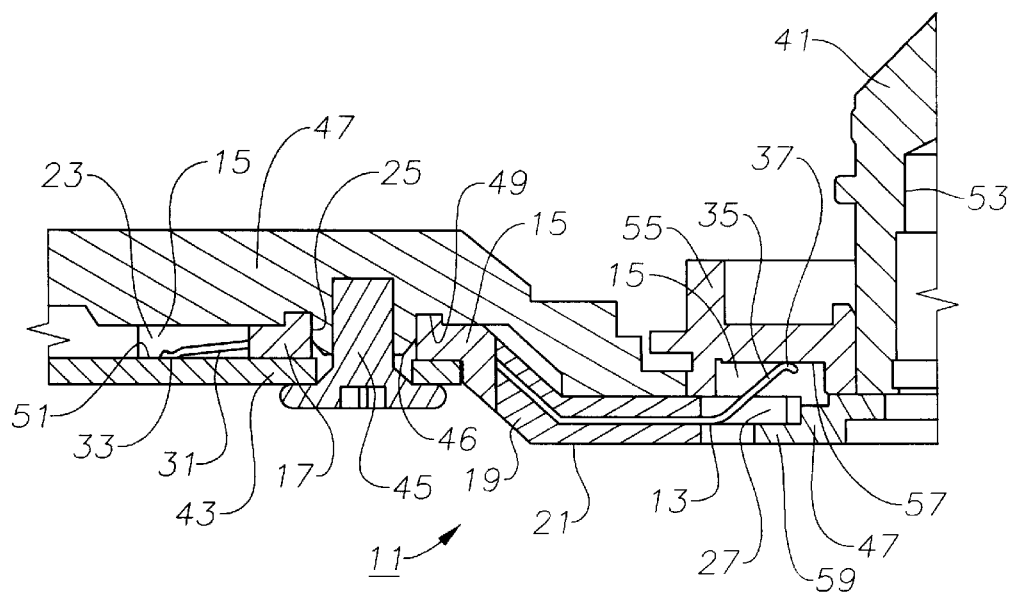
FIG. 2 is an inverted sectional side view of the electrical connector of FIG. 1 shown installed in a hard disk drive.

Referring to FIG. 1, a connector 11 having at least one metal contact 13 located within a plastic body 15 is shown. In the preferred embodiment, connector 11 has a pair of parallel contacts 13 which are molded within and extend completely through body 15 (FIG. 2) but do not touch one another. In alternate embodiments (not shown), connector 11 may contain more than two contacts 13.

Body 15 is generally rectangular when viewed from above and has a forward portion 17, a middle portion 19 and a rearward portion 21. Forward and rearward portions 17, 21 are generally planar and parallel to one another. Middle portion 19 is integrally formed with and extends diagonally at about 45 degrees between forward and rearward portions 17, 21. Forward portion 17 has a central tab 23 extending forward and parallel from a forward end. A central hole 25 extends perpendicularly through forward portion 17. Rearward portion 21 has a central tab 27 extending parallel and rearward from a rearward end. Tab 27 is shorter than tab 23. A pair of symmetrical notches 29 are located in one planar surface of rearward portion 21 along each of its sides.

Each contact 13 has approximately the same length as the overall length of body 15, including tabs 23 and 27. Contacts 13 are narrow strips of metallic spring material and have the same general shape as body 15 as they extend therethrough. Contacts 13 exit body 15 at the same points where tabs 23, 27 extend from body 15. It is at these points where contacts 13 deviate from the shape of body 15. Each contact 13 has a flexible, cantilevered forward spring 31 which is skewed or deflected at a small acute angle relative to forward portion 17 of body 15. Forward springs 31 of contacts 13 are slightly shorter than tab 23 and each has a contact point 33 on one surface near its forward end. Each contact 13 also has a flexible, cantilevered rearward spring 35 which is skewed or deflected at a large acute angle relative to rearward portion 21 of body 15. Rearward springs 35 of contacts 13 are skewed in an opposite direction to forward springs 31. Rearward springs 35 of contacts 13 are approximately equal in length to tab 27 and each has a contact point 37 near its rearward end.

In operation, connector 11 is designed to connect a spindle motor 41 inside a hard disk drive enclosure (not shown) to a printed circuit board 43 (PCB) mounted outside the disk enclosure. Connector 11 is secured with a screw 45 which extends through hole 25 to in forward portion 17 to a boss 46 on a baseplate 47. A press fit exists between hole 25 and boss 46 to retain connector 11 until PCB 43 can be installed. Connector 11 extends through and engages a lipped aperture 49 in baseplate 47. Aperture 49 closely receives connector body 15 to lock connector 11 from extraneous movement. PCB 43 has contact pads 51 on an inner surface which are provided for engaging contact points 33 on forward springs 31 when PCB 43 is secured to baseplate 47 with screw 45.

Spindle motor 41 has a shaft 53 to which is rigidly mounted a flange 55 on its distal end. Contact pads 57 are mounted on flange 55 to provide a contact surface for contact points 37 on rearward springs 35. Contact pads 57 face in an opposite direction to contact pads 51. Tab 27 interacts with a machined feature 59 on baseplate 47 to provide the required force to compress rearward springs 35 on the rearward end of connector 11.

Figure 3:
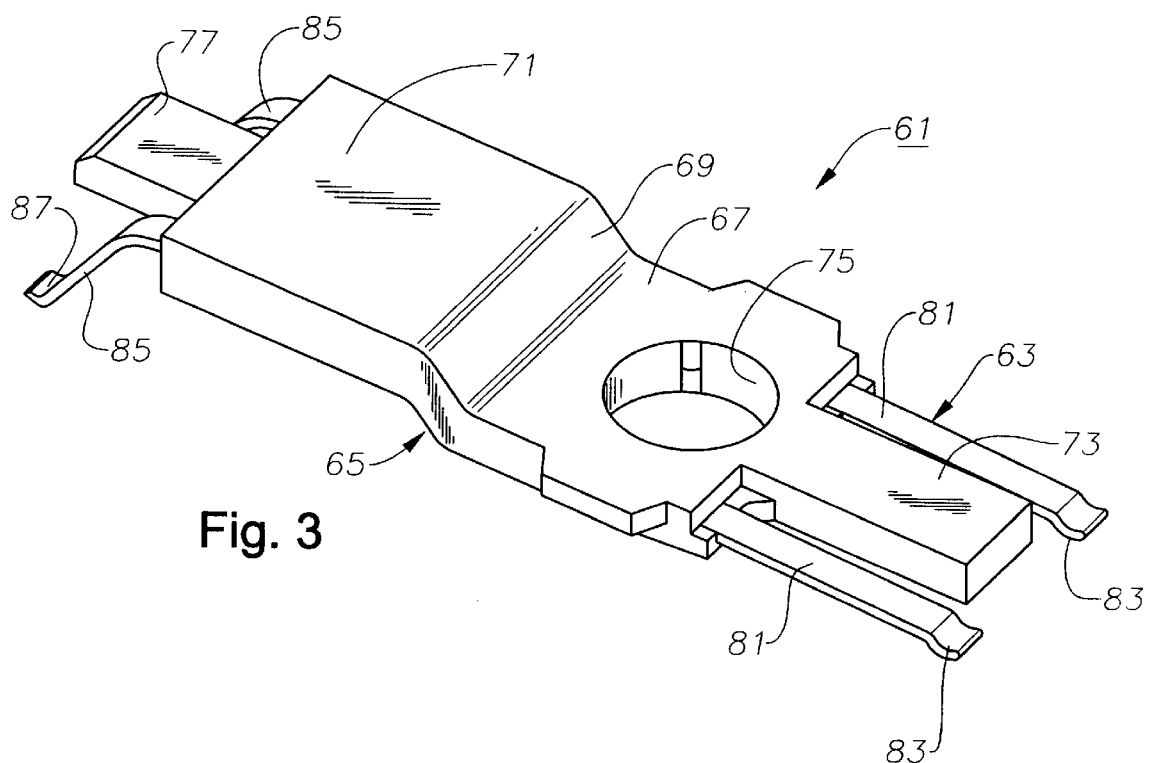
FIG. 3 is a lower isometric view of a second embodiment the electrical connector of FIG. 1.
Figure 4:
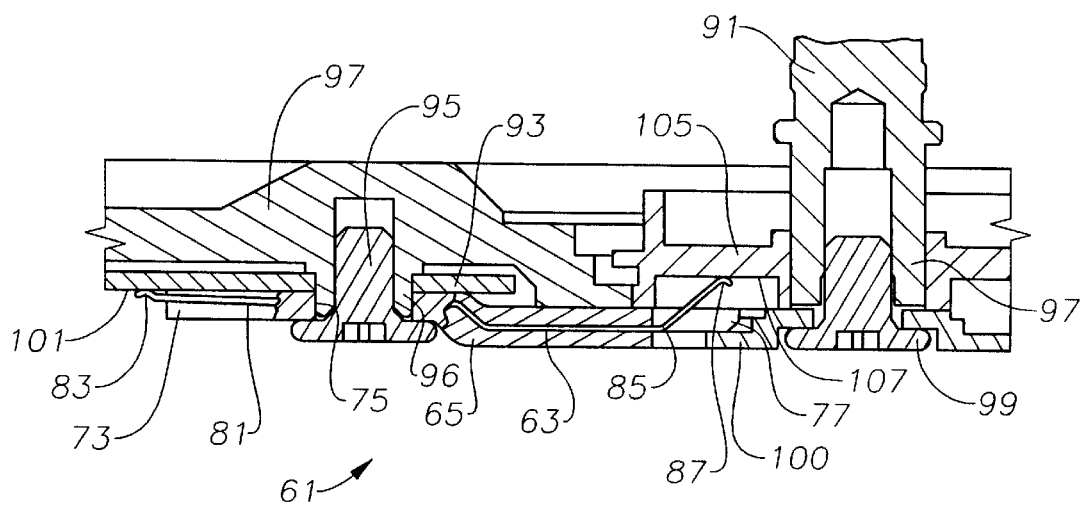
FIG. 4 is an inverted sectional side view of the electrical connector of FIG. 3 shown installed in a hard disk drive.

Referring to FIG. 3, a second embodiment of the invention is shown. A connector 61 having a pair of parallel metal contacts 63 located within a plastic body 65 is similar to connector 11. Like body 15, body 65 has a forward portion 67, a middle portion 69 and a rearward portion 71. Forward and rearward portions 67, 71 are parallel to one another and middle portion 69 extends diagonally between them. Forward portion 67 has a central tab 73 extending forward and parallel from a forward end. A central hole 75 extends through forward portion 67. Rearward portion 11 has a central tab 77 extending parallel and rearward from a rearward end. Tab 77 is shorter than tab 73.

Each contact 63 is a narrow strip of metal and has approximately the same length as the overall length of body 65, including tabs 73 and 77. Contacts 63 exit body 65 at the same points where tabs 73, 77 extend front body 65. Each contact 63 has a flexible, cantilevered forward spring 81 which is skewed or deflected at a small acute angle relative to forward portion 67 of body 65. Forward springs 81 of contacts 63 are slightly longer than tab 73 and each has a contact point 83 near its forward end. Each contact 63 also has a flexible, cantilevered rearward spring 85 which is skewed or deflected at a large acute angle relative to rearward portion 71 of body 65. Rearward springs 85 are skewed in the same direction as forward springs 81. Rearward springs 85 are approximately equal in length to tab 77 and each has a contact point 87 near its rearward end.

In operation, connector 61 connects a spindle motor 91 inside a hard disk drive enclosure (not shown) to a printed circuit board 93 (PCB) mounted outside the disk enclosure. Connector 61 is secured with a screw 95 which extends through hole 75 in forward portion 67 to a boss 96 on a baseplate 97. A press fit exists between hole 75 and boss 96 to retain connector 61 until screw 95 can be installed. Connector 61 is secured to a shaft 97 extending from spindle motor 91 with a second screw 99 and machined feature 100. Screws 95, 99 lock connector 61 from extraneous movement. PCB 93 has contact pads 101 on an outer surface which are provided for engaging contact points 83 on forward springs 81 when PCB 93 is secured between baseplate 97 and connector 61.

A flange 105 is rigidly mounted to the distal end of shaft 97 on spindle motor 91. Contact pads 107 are mounted on flange 105 to provide a contact surface for contact points 87 on rearward springs 85. Contact pads 107 face in the same direction as contact pads 101. Tab 77 interacts with machined feature 100 to provide the required force to compress rearward springs 85 on the rearward end of connector 61.

The invention has significant advantages. The connector includes all of the advantages of compression connectors presently available, but also allows for cordless motor operation. This design decreases the cost of the product by significantly reducing the size of the motor flexible cable. It also increases the throughput and yield on the manufacturing line. The connector has no cables to thread through holes and has no flexible cables contacting the disks. While the invention has been shown or described in only some of its forms, it should be apparent to those skilled in the art that it is not so limited, but is susceptible to various changes without departing from the scope of the invention.

We claim:

1. A connector for electrically connecting a spindle motor in a hard disk drive to a printed circuit board, comprising:
    an elongated insulative body having a motor end and a card end, the body being adapted to be mounted to a baseplate of the hard disk drive;
    a fastener for securing the body to a baseplate;
    at least one electrical conductor extending through the body from the motor end to the card end;
    a first resilient contact on the motor end of the electrical conductor which is adapted to make compressive contact with a contact pad on the spindle motor when the body is secured to the baseplate;
    a second resilient contact on the card end of the electrical conductor which is adapted to make compressive contact with a contact pad on the printed circuit board when the body is secured to the baseplate; and
    a tab extending from the motor end of the body which is adapted to interact with an element of the hard disk drive to bias the first resilient contact into engagement with the contact pad on the spindle motor when the connector is installed in the hard disk drive.

2. The connector of claim 1 wherein the first resilient contact and the second resilient contact are inclined in opposite directions relative to the body to make contact with their respective contact pads.

3. The connector of claim 1 wherein one of the resilient contacts is inclined at a greater angle relative to the body than the other of the resilient contacts.

4. The connector of claim 1 wherein the connector is adapted to be mounted to the baseplate with a single screw.

5. The connector of claim 1 wherein the card end of the connector is adapted to be located between the baseplate and the printed circuit board.

6. The connector of claim 1 wherein the body has a pair of parallel body platforms in offset planes which are joined by a ramp and wherein the electrical conductor is generally contoured to the shape of the body.

7. The connector of claim 1 wherein the each of the resilient contacts are flexible, cantilevered metallic spring members.

8. A hard disk drive, comprising:
    a baseplate;
    a spindle motor mounted to the baseplate and having at least one contact pad;
    a printed circuit board mounted to the baseplate and having at least one contact pad;
    a connector having an elongated insulative body with a motor end adjacent to the spindle motor and a card end adjacent to the printed circuit board, the connector being mounted to the baseplate;
    a fastener for securing the body to the baseplate;
    at least one electrical conductor extending through the body;
    a first compression contact on the motor end of the electrical conductor which makes compressive contact with the contact pad on the spindle motor when the body is secured to the baseplate;

a second compression contact on the card end of the electrical conductor which makes compressive contact with the contact pad on the printed circuit board when the body is secured to the baseplate; and a tab extending from the motor end of the body which biases the first compression contact into engagement with the contact pad on the spindle motor when the connector is installed in the hard disk drive.

9. The hard disk drive of claim 8 wherein the first compression contact and the second compression contact extend in opposite directions relative to an axis of rotation of the spindle motor to make contact with their respective contact pads.

10. The hard disk drive of claim 8 wherein one of the compression contacts is inclined at a greater angle relative to the body of the connector than the other of the compression contacts.

11. The hard disk drive of claim 8 wherein the connector is mounted to the baseplate with a single screw.

12. The hard disk drive of claim 8 wherein the card end of the connector is located between the baseplate and the printed circuit board.

13. The hard disk drive of claim 8 wherein the body has a pair of parallel platforms in offset planes which are joined by a ramp and wherein the electrical conductor is generally contoured to the shape of the body.

14. The hard disk drive of claim 8 wherein the each of the compression contacts are flexible, cantilevered metallic spring members.

15. A hard disk drive, comprising:

a baseplate;

a spindle motor mounted to the baseplate and having at least one contact pad;

a printed circuit board mounted to the baseplate and having at least one contact pad;

a connector having an elongated insulative body with a pair of parallel platforms in offset planes which are joined by a ramp, a motor end adjacent to the spindle motor and a card end adjacent to the printed circuit board, the connector being mounted to the baseplate with a single screw, wherein the card end of the connector is located between the baseplate and the printed circuit board;

a fastener for securing the body to the baseplate;

at least one electrical conductor extending through and generally contoured to the shape of the body;

a first compression contact on the motor end of the electrical conductor;

a tab extending from the motor end of the body which biases the first compression contact into engagement with the contact pad on the spindle motor;

a second compression contact on the card end of the electrical conductor which makes compressive contact with the contact pad on the printed circuit board, wherein the first compression contact and the second compression contact extend in opposite directions relative to an axis of rotation of the spindle motor to make contact with their respective contact pads; and wherein one of the compression contacts is inclined at a greater angle relative to the body than the other of the compression contacts; and wherein each of the compression contacts are flexible, cantilevered metallic spring members.

* * * * *